No. 864,756. PATENTED AUG. 27, 1907.
C. H. PHILLIPS.
DRILL.
APPLICATION FILED MAR. 28, 1907.
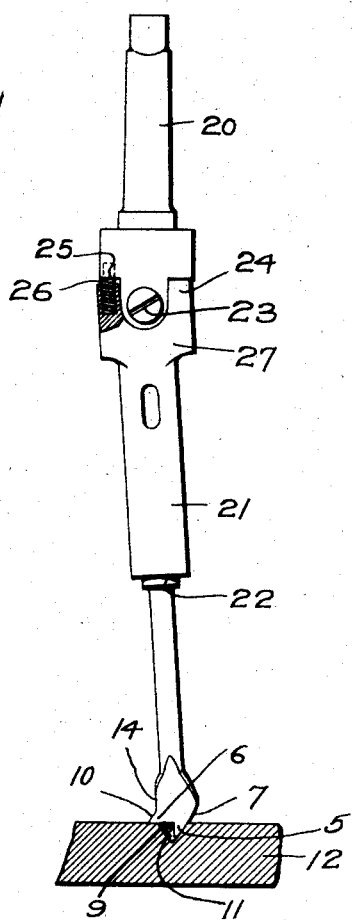
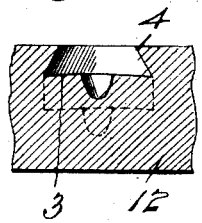
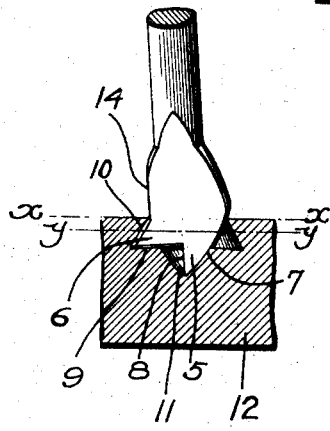
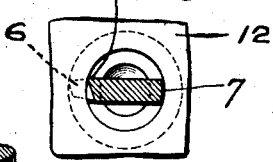
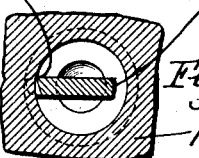
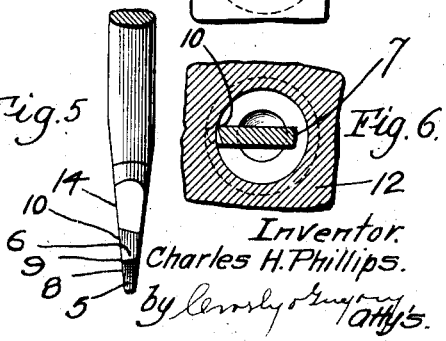
Witnesses.
W. C. Lunsford
Joseph M. Ward.
Inventor.
Charles H. Phillips.
by Connolly & Gregory
attys.

UNITED STATES PATENT OFFICE.

CHARLES H. PHILLIPS, OF BOSTON, MASSACHUSETTS, ASSIGNOR OF ONE-THIRD TO GEORGE W. GIDDINGS, OF BOSTON, MASSACHUSETTS.

DRILL.

No. 864,756.  Specification of Letters Patent.  Patented Aug. 27, 1907.

Application filed March 28, 1907. Serial No. 364,975.

*To all whom it may concern:*

Be it known that I, CHARLES H. PHILLIPS, a citizen of the United States, and a resident of Boston, in the county of Suffolk and State of Massachusetts, have invented an Improvement in Drills, of which the following description, in connection with the accompanying drawing, is a specification, like letters on the drawing representing like parts.

This invention has for its object to provide a novel drill by means of which a hole of tapering diameter can be bored.

My improved drill can be used in a great variety of places, and it is especially useful in connection with spot-babbitting of bearings.
I will first describe one embodiment of my invention and then point out the novel features thereof in the appended claims.

In the drawings, Figure 1 is a view of the drill and a chuck therefor showing the manner of operation;
Fig. 2 is a view showing the drill during the operation of boring a hole; Fig. 3 is a section through a piece of metal with a hole bored in it with my improved drill, said figure showing in dotted lines the shape the hole will take if the drilling is continued below the bottom of the recess 11. Fig. 4 is a section on the line $x$—$x$, Fig. 2; Fig. 5 is an edge view of the drill; Fig. 6 is a section through the drill on the line $y$—$y$, Fig. 2.

My improved drill is adapted to bore a hole having the cross-sectional shape shown in Fig. 3, that is, having a larger diameter at the lower end 3 thereof than at the upper end 4 thereof.

The drill is made with the centering point 5 and the cutting spur 6. The centering point has the inclined guiding edge 7 and the cutting edge 8 which is located in the line of the axis of the drill. The cutting spur 6 projects laterally at a distance above the end of the centering point and it is substantially V-shape, it having the cutting edge 9 which extends substantially at right angles to the axis of rotation and the inclined cutting edge 10 which is approximately parallel with the guiding edge 7. The cutting edges 8, 9 and 10 are all backed off to provide proper clearance, as shown in Figs. 5 and 6.

In order to use my improved drill it is necessary that the material 12 to be drilled be first spotted or provided with the conical recess 11. This spotting of the material can conveniently be done by means of an ordinary twist drill. After the work 12 is spotted my improved drill is placed in the position shown in Fig. 1 with the guiding edge 7 thereof resting on one side of the recess 11. As the drill is rotated the cutting edges 9 and 10 act on the work 12 and drill the hole or recess therein as will be obvious, and as the drilling proceeds the guiding edge 7 moves down the inclined wall of the recess 11 and causes the drill to be moved laterally with reference to the axis of rotation. This lateral movement of the drill causes the cutting edges 9 and 10 of the cutting spur 6 to act on the work thus cutting or drilling the hole or recess therein. The cutting edge 9 deepens the hole as the drilling operation proceeds while the cutting edge 10 gives the hole its undercut side wall. The forward movement of the drill operates to deepen the hole or recess and the lateral movement enlarges the diameter thereof.

If the cutting edge 10 is substantially parallel with the inclined wall of the recess 11 then the combined forward and lateral movement of the drill relative to the work will be substantially parallel to the cutting edge 10 and the drilling will be mainly done by the cutting edge 9. If, however, the inclined cutting edge 10 is not parallel with the wall of the recess 11 then said edge 10 will have more or less cutting operation. In any event the hole when completed will have undercut side walls and will be larger at its bottom than at its top.

In practice it is only necessary to make the conical recess 11 deep enough to form a guide for the centering point as the drilling operation starts. As soon as said centering point reaches the bottom of the recess 11 in the drilling operation the cutting edge 8 will cut the material away so as to permit the drill to continue its drilling operation, thus producing a hole shaped as shown in dotted lines, Fig. 3. This is an important feature of my invention because it permits me to drill the hole of any desired depth.

I am aware of Patent No. 412,508, dated October 8, 1889, in which is shown a drill for cutting holes of tapering diameter, but the device shown in this patent is so constructed that the hole cannot be drilled any deeper than the original spotting of the material will permit. In other words the depth of the hole is limited by the depth to which the material is spotted. With my improved drill this is not so because after the centering point has reached the bottom of the recess 11 originally made the cutting edge 8 of said centering point will operate to deepen the recess and permit the drill to continue its drilling operation. This is important because it is often desirable to drill the holes of different depth and a hole of any desired depth can be drilled. It will be noted that the guiding edge 7 is rounded somewhat, see Fig. 6, so that it does not cut the material. The drill may also be provided with the vertical cutting edge 14 which trims and smooths up the edge 4 of the hole.

During the cutting operation the drill has a lateral movement with respect to the axis of rotation, as above described, and it would not be feasible therefore to use this drill in an ordinary chuck. Accordingly I propose to use the drill in a chuck such as shown in the drawings and which comprises the shank 20, which is adapted to be held in the chuck of any drilling machine and the drill-holding member 21 into which the shank 22 of the drill is received.

The drill-holding portion is arranged so that it can have a lateral movement with reference to the shank 20, and for this purpose said drill-holding portion is pivoted to the shank, as at 23. The extent of the lateral movement of the drill-holding portion is limited by two shoulders 24 and 25 on the shank-portion 20, which are adapted to be engaged by the head 27 of the drill-holding portion. A spring 26 situated in a socket in the head 27 of the drill-holding portion and engaging the shoulder 25 serves to keep the drill-holding portion normally in the position shown in Fig. 1 but permits it to swing laterally as required during the drilling operation.

The particular form of chuck herein shown forms no part of the present invention and will be made the subject of another application.

Having described my invention what I claim as new and desire to secure by Letters Patent is:—

1. A drill presenting a centering point and a laterally projecting cutting spur, said centering point having an inclined guiding edge, and also having a cutting edge extending substantially parallel to the axis of rotation, and said cutting spur having two cutting edges arranged at an angle to each other.

2. A drill presenting a centering point and a laterally-projecting cutting spur, said centering point having an inclined-guiding edge and also having an axially-arranged cutting edge.

In testimony whereof, I have signed my name to this specification, in the presence of two subscribing witnesses.

CHARLES H. PHILLIPS.

Witnesses:
 LOUIS C. SMITH,
 MARGARET A. DUNN.